US012802580B2

(12) United States Patent
Kim

(10) Patent No.: US 12,802,580 B2
(45) Date of Patent: Nov. 17, 2026

(54) METHOD AND DEVICE FOR PARTITIONING AIRWAY OF UAM INTO MULTIPLE SECTIONS ON BASIS OF INFORMATION ON TRAVEL REGION

(71) Applicant: SK TELECOM CO., LTD., Seoul (KR)

(72) Inventor: Jeongseok Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/871,036

(22) PCT Filed: Jun. 29, 2023

(86) PCT No.: PCT/KR2023/009099
§ 371 (c)(1),
(2) Date: Dec. 2, 2024

(87) PCT Pub. No.: WO2024/010281
PCT Pub. Date: Jan. 11, 2024

(65) Prior Publication Data

US 2025/0342772 A1 Nov. 6, 2025

(30) Foreign Application Priority Data

Jul. 5, 2022 (KR) ........................ 10-2022-0082708

(51) Int. Cl.
*B64U 101/75* (2023.01)
*G08G 5/90* (2025.01)

(52) U.S. Cl.
CPC ..................................... *G08G 5/90* (2025.01)

(58) Field of Classification Search
CPC .. G08G 5/90; G08G 5/00; G08G 5/55; G08G 5/56; G08G 5/59; G08G 5/30; G05D 1/20
See application file for complete search history.

(56) References Cited

U.S. PATENT DOCUMENTS 10,553,121 B1 * 2/2020 de Oliveira ........... G06F 16/909
11,537,149 B2 * 12/2022 Sekiyama ................ G08G 5/55
(Continued)

FOREIGN PATENT DOCUMENTS

JP 6336872 B2 * 6/2018
JP 2019-38479 A 3/2019
(Continued)

OTHER PUBLICATIONS

International Search Report issued on Oct. 4, 2023, for corresponding International Patent Application No. PCT /KR2023/009099, along with an English translation (5 pages).
(Continued)

*Primary Examiner* — Redhwan K Mawari
(74) *Attorney, Agent, or Firm* — Hauptman Ham, LLP

(57) ABSTRACT

In accordance with an aspect of the present disclosure, there is provided a method for dividing a corridor of UAM (urban air mobility) into a plurality of regions by a corridor dividing device, the method comprising, acquiring information on a flight operation area of the UAM, and dividing a corridor defined in the flight operation area into a plurality of regions based on the information on the flight operation area, wherein the information on the flight operation area includes at least one of information on a region of interest in the flight operation area and information on an event which occurs in the flight operation area.

16 Claims, 9 Drawing Sheets

(56) References Cited

U.S. PATENT DOCUMENTS

| | | | | |
|---|---|---|---|---|
| 2011/0264311 | A1* | 10/2011 | Lee | H04N 7/183 348/E7.085 |
| 2016/0247412 | A1 | 8/2016 | Chen et al. | |
| 2016/0373892 | A1* | 12/2016 | Gotoh | H04W 4/024 |
| 2018/0061251 | A1* | 3/2018 | Venkatraman | G01C 21/20 |
| 2018/0324546 | A1* | 11/2018 | Jones | H04W 4/021 |
| 2020/0241573 | A1* | 7/2020 | Sekiyama | G08G 5/55 |
| 2022/0212813 | A1* | 7/2022 | Zhang | B60L 53/80 |
| 2022/0307833 | A1* | 9/2022 | Nishita | G01C 15/002 |
| 2022/0353697 | A1* | 11/2022 | Saha | H04W 64/006 |
| 2022/0366794 | A1* | 11/2022 | Kingston | G08G 5/727 |
| 2022/0377494 | A1* | 11/2022 | Jones | G08G 5/57 |

FOREIGN PATENT DOCUMENTS

| | | | |
|---|---|---|---|
| KR | 10-0530181 | B1 | 2/2006 |
| KR | 10-2022-0010893 | A | 1/2022 |
| WO | 2018/193578 | A1 | 10/2018 |

OTHER PUBLICATIONS

Written Opinion issued on Oct. 4, 2023, for corresponding International Patent Application No. PCT /KR2023/009099 (4 pages).

Office Action dated Jan. 15, 2026 for corresponding Korean Patent Application No. 10-2022-0082708, along with an English machine translation (17 pages).

Nichakorn Pongsakornsathien et al., "A Performance-Based Airspace Model for Unmanned Aircraft Systems Traffic Management", Aerospace, MDPI, Oct. 28, 2020, pp. 1-26.

Federal Aviation Administration, "Unmanned Aircraft System (UAS) Traffic Management (UTM) Concept of Operations", Version 2.0., Mar. 2, 2020, (80 pages).

Bernd Korn, "Concept for Urban Airspace Integration", DLR Blueprint, Dec. 2017, pp. 1-26.

Rakesh Shrestha et al., "A Survey on Operation Concept, Advancements, and Challenging Issues of Urban Air Traffic Management", frontiers in Future Transportation, vol. 2, Apr. 26, 2021, (20 pages).

* cited by examiner

METHOD AND DEVICE FOR PARTITIONING AIRWAY OF UAM INTO MULTIPLE SECTIONS ON BASIS OF INFORMATION ON TRAVEL REGION

CROSS-REFERENCE TO RELATED APPLICATION

The present application is a national stage filing under 35 U.S.C § 371 of PCT application number PCT/KR2023/009099 filed on Jun. 29, 2023 which is based upon and claims the benefit of priority to Korean Patent Application No. 10-2022-0082708 filed on Jul. 5, 2022 in the Korean Intellectual Property Office. All of the aforementioned applications are hereby incorporated by reference in their entireties.

TECHNICAL FIELD

The present disclosure relates to a method and device for dividing corridor of UAM into a plurality of regions based on information on flight operation area. This work was supported by Korea Agency for Infrastructure Technology Advancement grant funded by the Korea government (Ministry of Land, Infrastructure and Transport) in 2024 (Project unique No.: 2610000053: Project No.: 00143965: R&D project: Development of Virtual Integrated Operation and Verification Technology for Urban Air Mobility: Research Project Title: Development of Virtual Integrated Operation and Verification Technology for Urban Air Mobility; and Project period: 2024 Jan. 1.~2024 Dec. 31).

BACKGROUND ART

UAM (urban air mobility) utilizes spaces in the sky as a travel route by using a personal air vehicle (PAV) capable of vertical take-off and landing (VTOL).

UAM, as a next-generation mobility solution that maximizes travel efficiency in or around the city, emerges to solve the decline in travel efficiency caused by congested urban traffic and the rapid increase in social costs such as logistics transportation costs. Now that long-distance travel times have increased and traffic congestion has become more severe, UAM is considered as a future innovative task that solves these problems.

Meanwhile, unlike existing aircraft, UAM plans to operate a flight at low altitudes and at high densities, so various studies are being conducted on the types of corridors in which UAM operates a flight.

FIGS. 1A to 1D illustrate one example of a corridor in which UAM operates a flight, and referring to FIGS. 1A to 1D, types of corridors in which UAM operates a flight may include a full max type, a layer type, a zone type, and a tube type.

The full mix type corridor illustrated in FIG. 1A is a corridor of a type in which an aircraft can freely move according to the discretion of the aircraft. The full mix type corridor has the highest complexity and risk. The layer type corridor illustrated in FIG. 1B is a corridor of a type in which an aircraft in a specific travel direction operates a flight on a set layer. The layer type corridor has a similar feature to a corridor of the current aircraft.

The zone type corridor illustrated in FIG. 1C is a corridor of a type in which a plurality of zones are divided into an ascending section, a flight section, a descending section, etc., and the aircraft operates a flight in a corresponding zone according to a flight operation state of the aircraft. The tube type corridor illustrated in FIG. 1D is a corridor of a type in which each of a departure point and an arrival point, and takeoff and landing sections are considered an entrance or an exit of a virtual route. The tube type corridor is a corridor of a type in which the departure point and the arrival point, and the takeoff and landing sections are connected by the virtual route respectively.

There is a high possibility that the type of corridor in which UAM operates a flight will be operated in various types according to an environment to which UAM is applied, characteristics of a business operator, etc., rather than applying a rule that is common in all countries like the existing aircraft. Therefore, a method for effectively managing the corridor independently of the type of the corridor becomes an issue.

SUMMARY

The present disclosure provides a method and a device for dividing a corridor of UAM into a plurality of regions based on information on a flight operation area. However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for dividing a corridor of UAM (urban air mobility) into a plurality of regions by a corridor dividing device, the method comprising, acquiring information on a flight operation area of the UAM, and dividing a corridor defined in the flight operation area into a plurality of regions based on the information on the flight operation area, wherein the information on the flight operation area includes at least one of information on a region of interest in the flight operation area and information on an event which occurs in the flight operation area.

The dividing of the corridor into the plurality of regions may include deciding whether each of a first region and a second region among the plurality of regions corresponds to the region of interest based on the information on the region of interest, and determining a first size of the first region corresponding to the region of interest and a second size of a second region not corresponding to the region of interest so that the first size is smaller than the second size.

The dividing of the corridor into the plurality of regions may include deciding whether an event occurs in each of the first region and the second region among the plurality of regions based on the information on the event, and determining a first size of the first region where the event occurs and a second size of a second region where the event does not occur so that the first size is smaller than the second size.

The dividing of the corridor into the plurality of regions may include deciding whether each of a first region and a second region among the plurality of regions corresponds to the region of interest based on the information on the region of interest, deciding whether the event occurs in each of the first region and the second region based on the information on the event, and determining a location of and a size of each of the first region and the second region so that the first region corresponding to the region of interest or where the event occurs further overlaps with an adjacent region than the second region not corresponding to the region of interest and where the event does not occur.

The dividing of the corridor into the plurality of regions may include determining a start point and an end point of each of the plurality of regions so that the plurality of respective regions do not overlap with each other when the plurality of regions are formed in a form of a rectangular parallelepiped.

Each of the plurality of regions may be expressed by an identifier, a center point, and a radius when the plurality of regions are formed in a form of a sphere.

Each of the plurality of regions may be expressed by an identifier, a start point corresponding to any one vertex of the rectangular parallelepiped, and an end point corresponding to a vertex located in a diagonal direction of the start point when the plurality of regions are formed in the form of the rectangular parallelepiped.

The region of interest may be determined based on at least one of presence or absence of a vertiport, presence or absence of a high-rise building, whether a region to be the region of interest is a dense residential area, and a migratory bird movement path.

The information on the event may be determined based on at least one of a fire in a high-rise building, presence or absence of another aircraft, and whether a migratory bird moves.

The method may further comprise allocating an object to any one of the plurality of regions based on the location of the object in the flight operation area and defining the object by a time of confirming the object, a location vector of the object, and a size of the object.

The method may further comprise dividing, when the information on the flight operation area is changed, the corridor into the plurality of regions again based on the changed information on the flight operation area.

In accordance with another aspect of the present disclosure, there is provided a device for dividing a corridor, comprising, a transceiver acquiring information on a flight operation area of UAM (urban air mobility), a memory including a computer-executable instruction and a processor dividing a corridor defined in the flight operation area into a plurality of regions based on the information on the flight operation area by executing the instruction, wherein the information on the flight operation area includes at least one of information on a region of interest in the flight operation area and information on an event which occurs in the flight operation area.

In accordance with another aspect of the present disclosure, there is provided a non-transitory computer-readable storage medium storing a computer program, wherein the computer program, when executed by a processor, comprises an instruction for causing the processor to perform a method comprises, acquiring information on a flight operation area of the UAM and dividing a corridor defined in the flight operation area into a plurality of regions based on the information on the flight operation area, and wherein the information on the flight operation area includes at least one of information on a region of interest in the flight operation area and information on an event which occurs in the flight operation area.

According to an embodiment of the present disclosure, a corridor of UAM is divided into a plurality of regions based on information on a flight operation area to manage and control the corridor independently of the type of corridor.

According to an embodiment of the present disclosure, the corridor of UAM is divided into the plurality of regions based on the information on the flight operation area to more sensitively monitor a location movement or a state of an aircraft.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

Figure 1A:
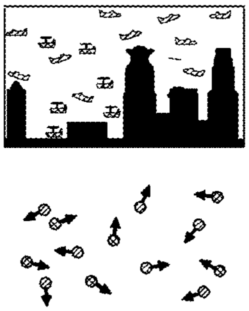
FIGS. 1A to 1D illustrate one example of a type of corridor in which UAM operates a flight.
Figure 1B:
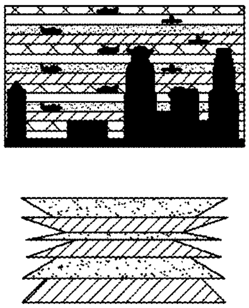
Figure 1C:
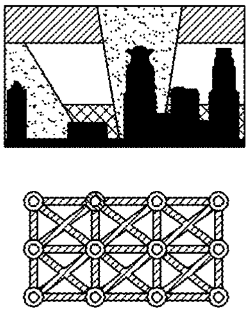
Figure 1D:
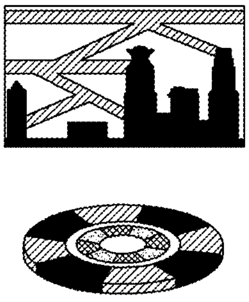
Figure 2:
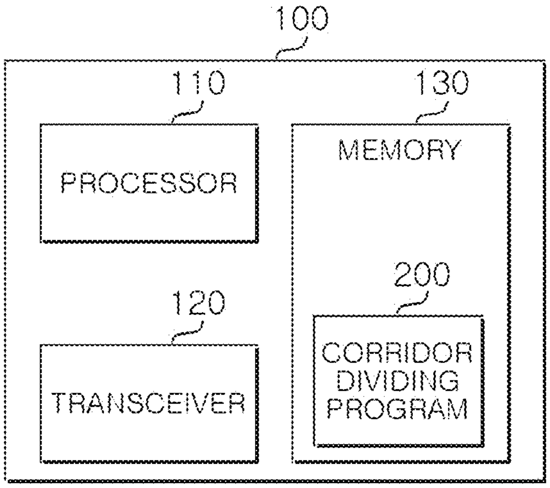
FIG. 2 is a block diagram illustrating a corridor dividing device according to an embodiment.

FIG. 2 is a block diagram illustrating a corridor dividing device according to an embodiment.

Referring to FIG. 2, the corridor dividing device 100 may divide a corridor predefined in a flight operation area based on information on the flight operation area into a plurality of areas, and allocate an object located in the flight operation area to any one of the plurality of areas.

According to the embodiment, the corridor dividing device 100 may correspond to a device managed by UAM Air Traffic Management Service Provider (UATMSP), which controls (manages) the corridor for each corridor, or may be included in a virtual logical space management system that manages the sharing of information controlled in each corridor so that the information may be shared between UATMSPs.

Alternatively, according to the embodiment, the corridor dividing device 100 may correspond to a device managed by an operator of a vertiport, may correspond to a device in which a flight operator controls an aircraft, may be included in an Air Traffic Control (ATC) system that controls a flight operation of existing aircraft, and may correspond to a device managed by a flight operation support information provider (or an additional service provider) that provides information required for the flight operation, such as weather information, geographic information system (GIS) information, etc.

The corridor dividing device 100 may include a processor 110, a transceiver 120, and a memory 130.

The processor 110 may control an operation of the corridor dividing device 100 overall.

The processor 110 may obtain information on a flight operation area from a flight operation control device by using the transceiver 120 and a location of each of at least one object located in the flight operation area.

Here, the flight operation area may mean an area where aircraft such as UAM (urban air mobility), drones, etc., operate a flight, and the flight operation control device may mean a control system that controls the flight operation of the aircraft.

Further, the object may include an obstacle which becomes the obstacle of the flight operation of the aircraft, which is generated by an event which occurs in the flight operation area in addition to the aircraft such as UAM, the drone, etc. For example, when a fire occurs in a high-rise building and smoke from the fire spreads to one of a plurality of areas, the smoke may correspond to an object into any one of the areas.

In the present disclosure, for convenience of description, it is described that the corridor dividing device 100 receives information about the flight operation area by using the transceiver 120, but the present disclosure is not limited thereto. That is, according to the embodiment, the corridor dividing device 100 may include an input/output device (not illustrated) in addition to the transceiver 120 or instead of the transceiver 120, and the corridor dividing device 100 may alto receive the information about the flight operation area by using the input/output device (not illustrated). Accordingly, the transceiver 120 and the input/output device (not illustrated) may also be collectively referred to as an acquisition unit.

The memory 130 may store a corridor dividing program 200 and information required for executing the corridor dividing program 200.

In the present disclosure, the corridor dividing program 200 may mean software including instructions programmed to divide a corridor defined in a flight operation area based on information on the flight operation area into a plurality of areas, and allocate an object located in the flight operation area to any one of the plurality of areas.

The processor 110 may load the corridor dividing program 200 and the information required for executing the corridor dividing program 200 from the memory 130 in order to execute the corridor dividing program 200.

The processor 110 executes the corridor dividing program 200 to divide the corridor predefined in the flight operation area based on the acquired information on the flight operation area into a plurality of areas, and allocate the object located in the flight operation area to any one of the plurality of areas.

A function and/or an operation of the corridor dividing program 200 will be described in detail through FIG. 3.

Figure 3:
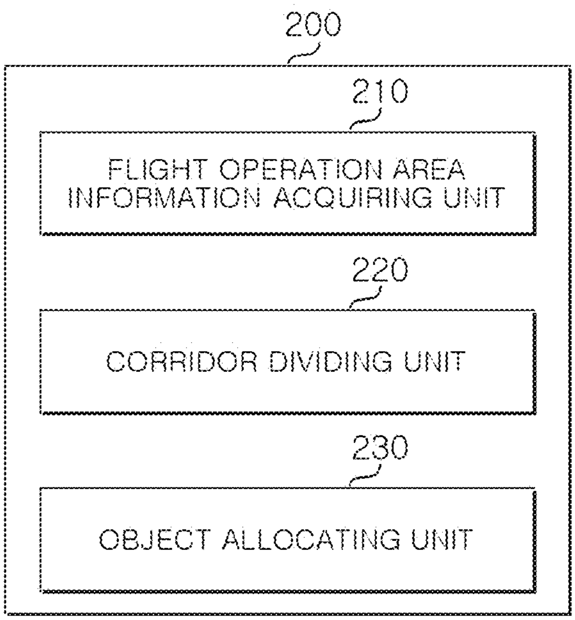
FIG. 3 is a block diagram conceptually illustrating a function of a corridor dividing program according to an embodiment.

FIG. 3 is a block diagram conceptually illustrating a function of a corridor dividing program according to an embodiment.

Referring to FIGS. 2 and 3, the corridor dividing program 200 may include a flight operation area information acquiring unit 210, a corridor dividing unit 220, and an object allocating unit 230.

The flight operation area information acquiring unit 210, the corridor dividing unit 220, and the object allocating unit 230 illustrated in FIG. 3 conceptually divide a function of the corridor dividing program 200 in order to easily describe the function of the corridor dividing program 200, and the present disclosure is not limited thereto. In some embodiments, functions of each of the flight operation area information acquiring unit 210, the corridor dividing unit 220, and the object allocating unit 230 are enabled to be merged/separated, and may be implemented as a series of instructions included in one program.

The flight operation area information acquiring unit 210 may acquire the information about the flight operation area.

The information about the flight operation area may include at least one of information on a region of interest in the flight operation area and information on an event which occurs in the flight operation area.

Here, the region of interest is a region of high interest for a safe flight operation of the aircraft and may correspond to an area where the density of aircraft is high, an obstacle exists in the flight operation of the aircraft, or the density of people is high, so safety precautions must be taken. For example, the region of interest may include a region where a vertiport is located, a region where high-rise buildings are located, a residential area, and a region corresponding to a migration path of migratory birds (this includes the sky above the corresponding region).

Further, the event is a one-time, regular or irregular event that occurs in connection with the flight operation of the aircraft and may include a situation such as a fire in a high-rise building, a hot air balloon, or other types of aircraft not controlled by the flight operation control device in the sky, or migratory birds currently moving.

The corridor dividing unit 220 may divide the corridor of the aircraft in the flight operation area into a plurality of regions based on the information on the flight operation area.

To this end, the corridor dividing unit 220 may define each of the plurality of regions acquired by dividing the corridor of the aircraft by an identifier, a location, and a size.

Here, the identifier as an ID for identifying each of the plurality of regions may be determined by an arrangement order, a location, a region, etc.

Further, the location as an actual coordinate representing an actual location of each of the plurality of regions on the actual Earth may be expressed as latitude, longitude, and altitude, or may be a virtual coordinate representing each of the plurality of regions in a predetermined map representing the flight operation area (that is, a relative coordinate defined within the map).

Further, the size may be expressed as an actual length or an actual size on the actual Earth, or expressed as a virtual length or a virtual size used in the predetermined map.

More specifically, the corridor dividing unit 220 may express locations and sizes of the plurality of regions differently according to predetermined forms of the plurality of regions. That is, when the plurality of regions are formed in a 3-dimensional space having a form of a sphere or a rectangular parallelepiped (including a cube), the corridor dividing unit 220 may express the locations and sizes of the plurality of regions differently from each other when the plurality of regions are in the form of the sphere and when the plurality of regions are in the form of the rectangular parallelepiped.

For example, when each of the plurality of regions is formed in the form of the sphere, the corridor dividing unit 220 may express the location and the size of each of the plurality of divided regions as a center point and a radius.

Alternatively, for example, when each of the plurality of regions is formed in the form of the rectangular parallelepiped, the corridor dividing unit 220 may express the location and the size of each of the plurality of divided regions as a start point and an end point.

Here, the start point may represent any one of the vertices of the rectangular parallelepiped, and the end point may represent a vertex located in a diagonal direction of the vertex corresponding to the start point among the vertices of the rectangular parallelepiped.

Figure 4:
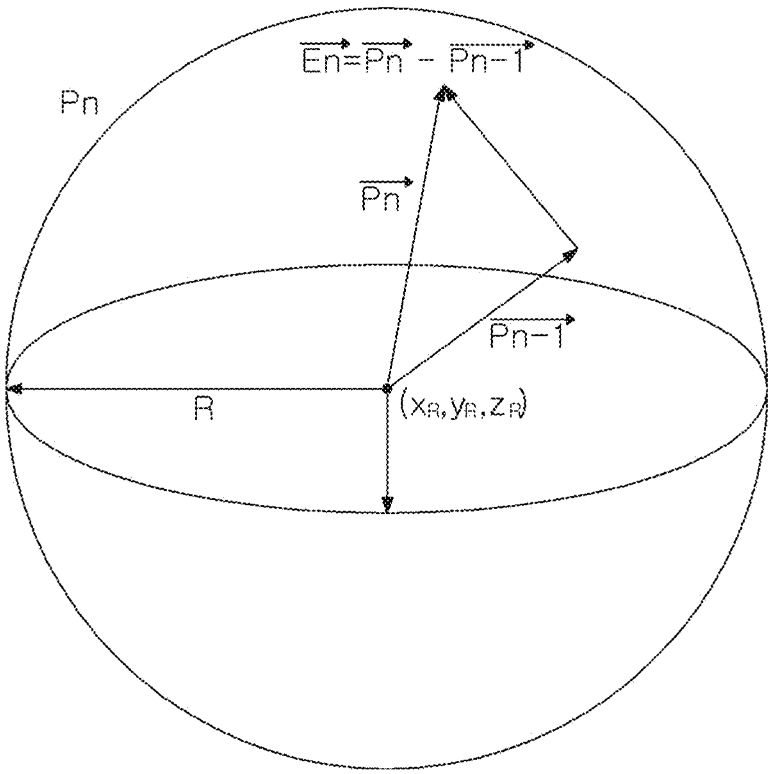
FIG. 4 illustrates one example of expressing a center point of a region, a radius of a region, and a location vector of an object located in the region when a plurality of regions are formed in a form of a sphere.
Figure 5:
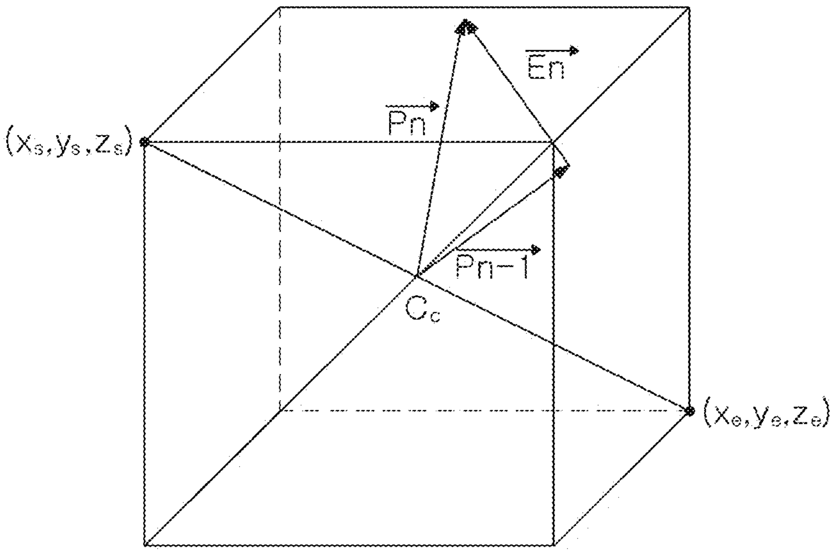
FIG. 5 illustrates one example of expressing a start point of a region, an end point of a region, and a location vector of an object located in the region when the plurality of regions are formed in a form of a rectangular parallelepiped.

For example, FIG. 4 illustrates an example of expressing the center point and the radius of the region and a location vector of an object located within the region when the plurality of regions are formed in the form of the sphere, and FIG. 5 is an example of expressing the start point and the end point of the region, and the location vector of the object located within the region when the plurality of regions are formed in the form of the rectangular parallelepiped.

Referring further to FIG. 4, when the plurality of regions are formed in the form of the sphere, the center point may be expressed as (XR, YR, ZR), and the radius may be expressed as R.

On the other hand, referring further to FIG. 5, when the plurality of regions are formed in the form of the rectangular parallelepiped, the start point may be expressed as $(x_s, y_s, z_s)$, and the end point may be expressed as $(x_e, y_e, z_e)$.

At this time, the location is the center point, which is the midpoint between the start point and the end point of the rectangular parallelepiped, and may be calculated using Equation 1 below.

$$C_c = (x_c, y_c, z_c) = \left(\frac{x_s + x_e}{2}, \frac{y_s + y_e}{2}, \frac{z_s + z_e}{2}\right) \quad \text{[Equation 1]}$$

Where $C_C$ may represent the center point, and $(x_c, y_c, z_c)$ may represent an actual coordinate or a virtual coordinate of the center point.

Referring back to FIG. 3, the corridor dividing unit 220 may divide the corridor of the aircraft in the flight operation area into the plurality of regions based on the information on the flight operation area.

More specifically, the corridor dividing unit 220 may determine the region of interest and the region where the event occurs in the corridor based on the information on the flight operation area, and determine a first size and a second size so that a first size of a first region corresponding to the region of interest or corresponding to the region where the event occurs among the plurality of regions is smaller than a second size of a second region not corresponding to the region of interest or not corresponding to the region where the event occurs.

This is because, when an object is located in an area corresponding to the region of interest or the region where the event occurs, it is necessary to more sensitively monitor a location movement or a state of the object.

Therefore, the corridor dividing unit 220 may adjust the number of objects located in the first region and the number of objects located in the second region, and determine the size of the first region to be smaller than the second size of the second region in order to performs communication without a delay with the objects located in the first region.

Further, in order to more sensitively monitor the location movement or state of the object whether the region corresponds to the region of interest or whether the event occurs, the corridor dividing unit 220 may determine the location and/or the size of each of the plurality of regions so that at least a part of each of the plurality of regions overlaps with at least a part of at least one adjacent region.

This is because there may be a detailed region that requires more sensitive monitoring even within one region, and detailed regions that require more sensitive monitoring may be present across two regions for one purpose/reason. In addition, this is because, when the plurality of regions are formed in the form of the sphere, unlike the case where the plurality of regions are formed in the form of the rectangular parallelepiped, depending on the degree of overlap with adjacent regions, the plurality of regions may not cover the entire corridor, or a ratio of a portion covered by the plurality of regions in the entire corridor may be smaller than a predetermined ratio.

More specifically, the corridor dividing unit 220 may determine the region of interest and the region where the event occurs in the corridor based on the information on the flight operation area, and determine at least one of the locations and the sizes of the first region and the second regions, respectively, so that an overlap degree between the first region corresponding to the region of interest or the corresponding to the region where the event occurs among the plurality of regions, and an adjacent region of the first region is larger than an overlap degree between the second region not corresponding to the region of interest or not corresponding to the region where the event occurs, and an adjacent region of the second region.

Meanwhile, according to the embodiment, unlike the case where the plurality of regions are formed in the form of the sphere, when the plurality of regions are formed in the form of the rectangular parallelepiped, since the plurality of regions may cover the entire corridor closely by engagement with each other, the corridor dividing unit 220 may also determine the start point and the end point of each of the plurality of regions so that there is no overlap between the plurality of regions.

Figure 6A:
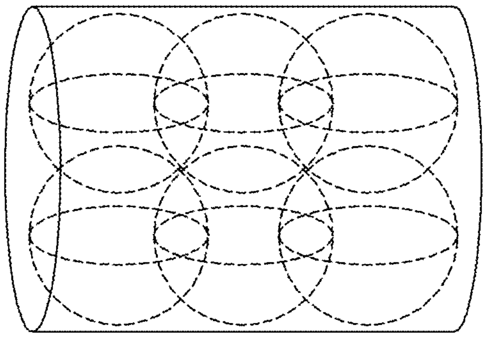
FIGS. 6A and 6B illustrate one example in which the plurality of regions are placed to overlap with an adjacent region according to the type of corridor.
Figure 6B:
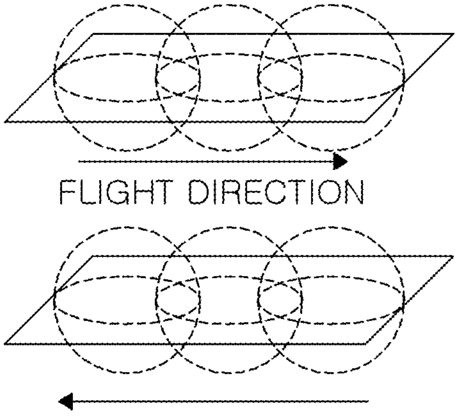
Figure 7A:
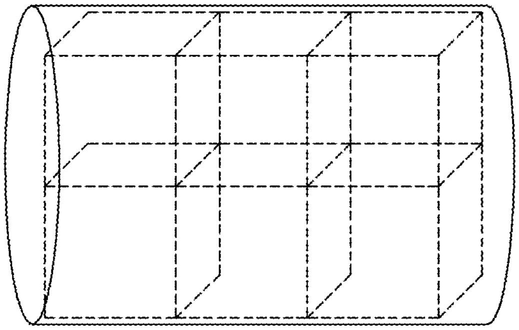
FIGS. 7A and 7B illustrate one example in which the plurality of regions are placed not to overlap with the adjacent region according to the type of corridor.
Figure 7B:
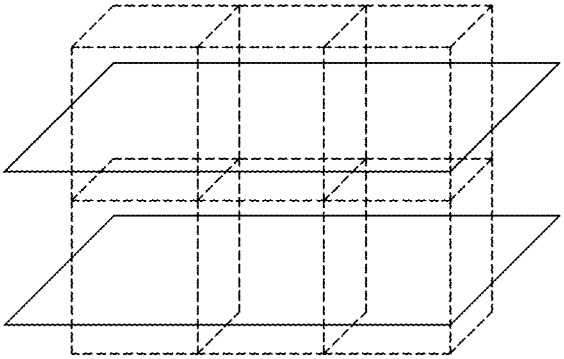

For example, FIGS. 6A and 6B illustrate one example in which the plurality of regions are placed to overlap with an adjacent region according to the form of the corridor, and FIGS. 7A and 7B illustrate one example in which the plurality of regions are placed not to overlap with the adjacent region according to the form of the corridor.

Referring further to FIG. 6A, when the form of the corridor is a tube, the corridor dividing unit 220 may determine the locations and the sizes of the plurality of regions so that the plurality of regions overlap with the adjacent region without deviating from the tube.

For example, the corridor dividing unit 220 may determine center points and radii of the plurality of regions so that an outer surface of the sphere is in contact with an inner surface of the tube.

Further, referring further to FIG. 6B, when the form of the corridor is a layer, the corridor dividing unit 220 may determine the locations and the sizes of the plurality of regions so that one layer is parallel to a plurality of regions formed in line, and the plurality of regions formed in line overlap with the adjacent region while including the one layer.

For example, the corridor dividing unit 220 may determine the locations and sizes of the plurality of regions so that one layer meets the center point of each of the plurality of regions formed in parallel.

In addition, referring further to FIG. 7A, when the form of the corridor is the tube, the corridor dividing unit 220 may determine start points and end points of the plurality of regions so that the plurality of regions do not overlap with the adjacent region while including the tube.

For example, the corridor dividing unit 220 may determine the center points and radii of the plurality of regions so that an upper surface of the rectangular parallelepiped located at a lower portion above and an outer surface of the tube are in contact with each other, and a lower surface of the rectangular parallelepiped located at a lower portion and the outer surface of the tube are in contact with each other.

In addition, referring further to FIG. 7B, when the form of the corridor is the layer, and the plurality of regions are formed in the form of the rectangular parallelepiped, the corridor dividing unit 220 may determine the start points and end points of the plurality of regions so that one layer is parallel to the plurality of regions formed in line, and the plurality of regions formed in line do not overlap with the adjacent region while including the one layer.

For example, the corridor dividing unit 220 may determine the start points and end points of the plurality of regions so that one layer meets the center point of each of the plurality of regions formed in parallel.

Referring back to FIG. 3, the corridor dividing unit 220 may periodically acquire the information on the flight operation area, and determine whether to update the division of the corridor according to an acquired result.

More specifically, when the information on the flight operation area is changed, the corridor dividing unit 220 may divide the corridor of the aircraft in the flight operation area into a plurality of regions again based on the changed information on the flight operation area.

The object allocating unit 230 may allocate each of at least one object located in the flight operation area to any one of a plurality of regions acquired by dividing the corridor of the aircraft.

More specifically, the object allocating unit 230 may acquire the location of each of the at least one object, compare the acquired location with the location and size of each of the plurality of regions, and, according to the result of the comparison, allocate each of the at least one object to any one of the plurality of regions.

For example, when the plurality of regions are formed in the form of the sphere, the object allocating unit 230 may allocate the object to a region in which a distance between the location and the center point of the object is closest among the plurality of regions.

Further, when the plurality of regions are formed in the form of the rectangular parallelepiped, the object allocating unit 230 compares the location of the object, and the start point and the end point of each of the plurality of regions to allocate the corresponding object to the region where the object is located among the plurality of regions.

According to the embodiment, the object allocating unit 230 may define the allocated object as in Equation 2 below.

$$T = \{t_{timestamp}, S_{uuid}, E\} \quad \text{[Equation 2]}$$

Where $t_{timestamp}$ represents a time of confirming the location of the object, $S_{uuid}$ represents an identifier of the region to which the object is allocated, and E represents an attribute of the object.

According to the embodiment, the attribute of the object may be defined as in Equation 3 below.

$$E = \left\{\overrightarrow{E_N}, (L_w, L_h, L_d)\right\} \quad \text{[Equation 3]}$$

$$\overrightarrow{E_N} = \overrightarrow{P_N} - \overrightarrow{P_{N-1}}$$

Where $$\overrightarrow{E_N}$$

may represent the location vector of the object, $$\overrightarrow{P_N}$$

may represent a location coordinate of the object at the time of confirming the location of the object, and $$\overrightarrow{P_{N-1}}$$

may represent a location coordinate of the object at a previous time. Further, $L_w$ may represent a width occupied by the object, $L_h$ may represent a height occupied by the object, and La may represent a length occupied by the object.

According to the embodiment, in the case of an event in which the object includes only coordinate information, 0 may be allocated to ($L_w$, $L_h$, $L_d$).

Accordingly, referring back to FIG. 4, when the plurality of regions are formed in the form of the sphere, the object moves from $$\overrightarrow{P_{N-1}} \text{ to } \overrightarrow{P_N}$$

based on the center point, so a movement vector may be expressed as $$\overrightarrow{E_N}.$$

Further, referring back to FIG. 5, when the plurality of regions are formed in the form of the rectangular parallelepiped, the object moves from $$\overrightarrow{P_{N-1}} \text{ to } \overrightarrow{P_N}$$

based on the center point of the rectangular parallelepiped, so the movement vector may be expressed as $\overrightarrow{E_N}$.

The object allocating unit 230 may acquire the information on the flight operation area and the location of the object located in the flight operation area periodically or aperiodically, and determine whether to update allocation of the object according to the acquired result.

More specifically, when at least one of the information on the flight operation area and the location of the object is changed, the object allocating unit 230 may allocate each of at least one object located in the flight operation area to any one of the plurality of regions acquired by dividing the corridor of the aircraft again based on the at least one changed.

For example, the object allocating unit 230 may allocate each of at least one object located within the flight operation area to any one of the plurality of regions again when the information on the flight operation area is changed, but allocate only an object of which location is changed to any one of the plurality of regions again when the location of the object is changed.

Figure 8:
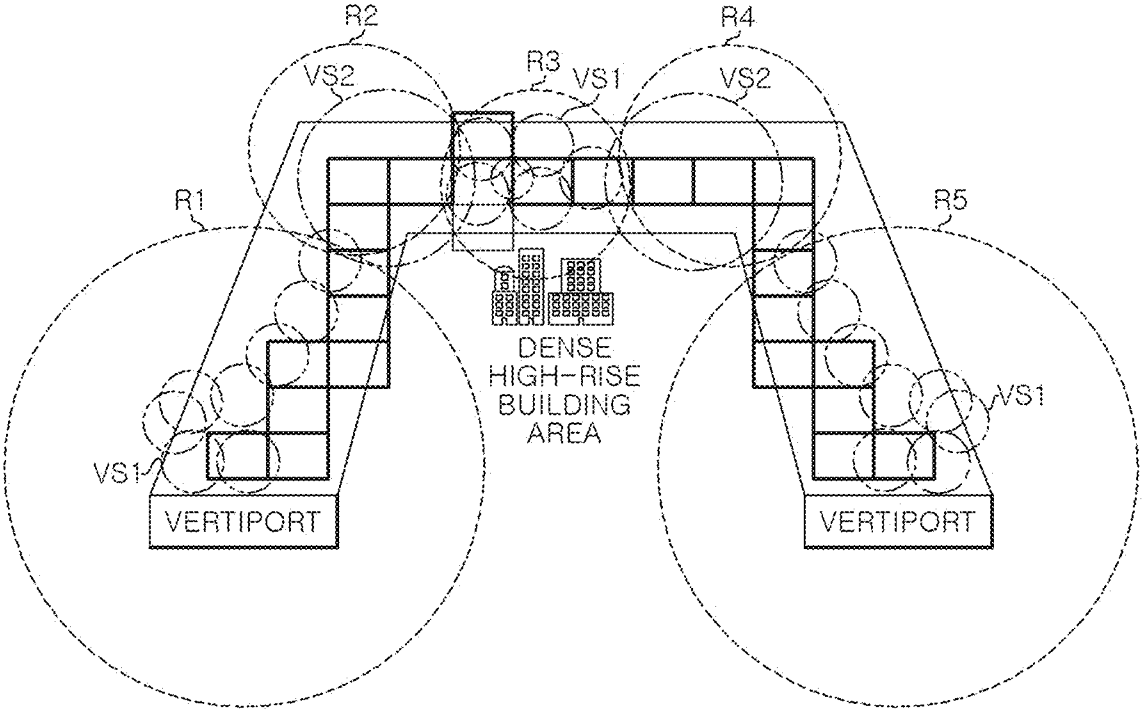
FIG. 8 illustrates one example in which a corridor dividing unit divides the corridor into the plurality of regions based on information on a region of interest.

FIG. 8 illustrates one example in which a corridor dividing unit divides the corridor into the plurality of regions based on information on a region of interest.

Referring to FIGS. 3 and 8, the density of the aircraft is high in the vertiport, and a region where high-rise buildings are located has obstacles to the flight operation of the aircraft, so a first region R1 and a fifth region R5 where the vertiports are located, and a third region R3 where the high-rise buildings are located may correspond to the region of interest.

On the other hand, a second region R2 and a fourth region R4, where there are no vertiports or high-rise buildings, so the density of the aircraft is low, and there are no obstacles to the flight operation of the aircraft, may not correspond to the region of interest.

Therefore, the corridor dividing unit 220 may determine a size of each of first regions VS1 and second regions VS2 so that sizes of the first regions VS1 located within the first region R1, the third region R3, and the fifth region R5 are smaller than sizes of the second regions VS2 located in the second region R2 and the fourth region R4 among the plurality of regions.

In addition, the corridor dividing unit 220 may determine the locations and the sizes of the first regions VS1 and the second regions VS2, respectively, so that the first regions VS1 overlap with each other further than the second regions VS2.

Figure 9:
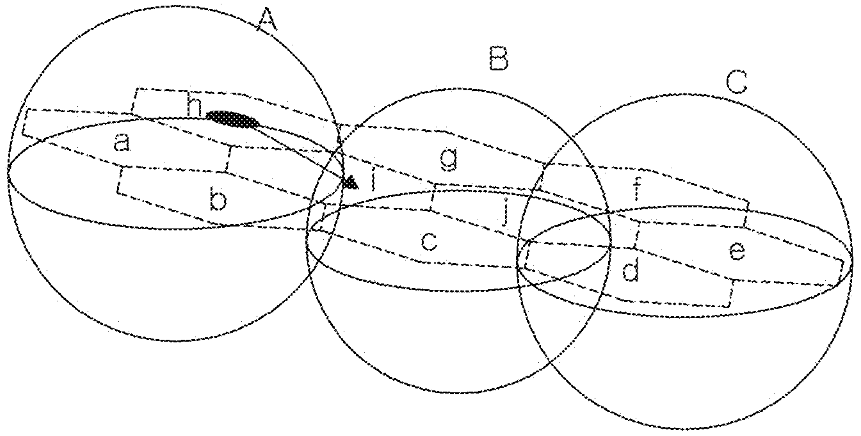
FIG. 9 illustrates one example in which the plurality of regions divided by the corridor dividing unit are matched with an existing aviation system.

FIG. 9 illustrates one example in which the plurality of regions divided by the corridor dividing unit are matched with an existing aviation system.

Referring to FIGS. 3 and 9, the existing aviation system divides the existing corridor into a plurality of hexagon planes.

Accordingly, by comparing the location of each of the plurality of regions generated by the corridor dividing unit 220 and an existing location of each of the plurality of hexagon planes, each of the plurality of regions may be matched with each of the plurality of hexagon planes.

For example, a first region A may be matched with a first hexagon plane a, a second hexagon plane b, an eighth hexagon plane h, and a ninth hexagon plane I, a second region B may be matched with a third hexagon plane c, a seventh hexagon plane g, a ninth hexagon plane i, and a tenth hexagon plane j, and a third region C may be matched with a fourth hexagon plane d, a fifth hexagon plane e, a sixth hexagon plane f, and the tenth hexagon plane j.

Accordingly, according to the embodiment, the plurality of regions A, B, and C may be matched with the plurality of hexagon planes a, b, c, d, e, f, g, h, I, and j as in Equation 4 below.

$$A = \{a, b, h, i\}$$
$$B = \{c, g, i, j\}$$
$$C = \{d, e, f, j\}$$ [Equation 4]

Figure 10:
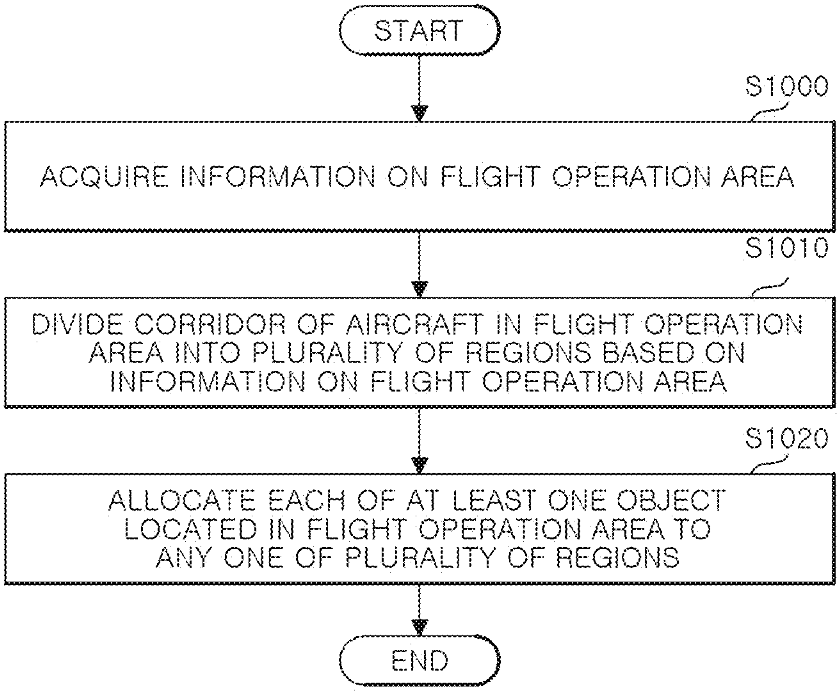
FIG. 10 is a flowchart illustrating a method in which a corridor dividing program divides the corridor, and allocates an object according to an embodiment.

FIG. 10 is a flowchart illustrating a method in which a corridor dividing program divides the corridor and allocates an object according to an embodiment.

Referring to FIGS. 3 and 10, a flight operation area information acquiring unit 210 may acquire information on a flight operation area (S1000), and a corridor dividing unit 220 may divide a corridor in an aircraft in the flight operation area into a plurality of regions based on the information on the flight operation area (S1010).

An object allocating unit 230 may allocate each of at least one object located in the flight operation area to any one of a plurality of regions acquired by dividing the corridor of the aircraft (S1020).

According to an embodiment of the present disclosure, a corridor of UAM is divided into a plurality of regions based on the information on the flight operation area to manage and control the corridor independently of the type of corridor.

According to an embodiment of the present disclosure, the corridor of UAM is divided into the plurality of regions based on the information on the flight operation area to more sensitively monitor a location movement or a state of the aircraft.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for dividing a corridor of UAM (urban air mobility) into a plurality of regions to manage the corridor by a corridor dividing device that includes a transceiver, a memory, and a processor, the method comprising:

acquiring, by the transceiver, information on a flight operation area of the UAM;

dividing, by the processor, a corridor defined in the flight operation area into a plurality of regions based on the information on the flight operation area; and allocating, by the processor, an object to any one of the plurality of regions based on a location of the object in the flight operation area, wherein the information on the flight operation area includes at least one of information on a region of interest in the flight operation area and information on an event which occurs in the flight operation area, wherein the dividing of the corridor into the plurality of regions includes:

identifying of a type of the corridor based on information on a flight operation area of the UAM;

dividing the corridor into the plurality of regions based on the type of the corridor;

determining each of the plurality of regions as one of a first region and a second region based on the information on the flight operation area, wherein the first region corresponds to any one of the region of interest and the region where the event occurs, and the second region corresponds to neither the region of interest nor the region where the event occurs; and determining locations and sizes of the first regions and the second regions such that a first size of the first region is smaller than a second size of the second region and adjusting the number of objects located in the first regions and the second regions to perform communication without a delay with the objects located in the first region.

2. The method of claim 1, wherein the location and the size of each of the first regions and the second regions are determined such that an overlap between two of the first regions is larger than an overlap between two of the second regions.

3. The method of claim 1, wherein the dividing of the corridor into the plurality of regions includes:

determining a start point and an end point of each of the plurality of regions so that the plurality of respective regions do not overlap with each other when the plurality of regions are formed in a form of a rectangular parallelepiped.

4. The method of claim 1, wherein each of the plurality of regions is expressed by an identifier, a center point, and a radius when the plurality of regions are formed in a form of a sphere.

5. The method of claim 1, wherein each of the plurality of regions is expressed by an identifier, a start point corresponding to any one vertex of the rectangular parallelepiped, and an end point corresponding to a vertex located in a diagonal direction of the start point when the plurality of regions are formed in the form of the rectangular parallelepiped.

6. The method of claim 1, wherein the region of interest is determined based on at least one of presence or absence of a vertiport, presence or absence of a high-rise building, whether a region to be the region of interest is a dense residential area, and a migratory bird movement path.

7. The method of claim 1, wherein the information on the event is determined based on at least one of a fire in a high-rise building, presence or absence of another aircraft, and whether a migratory bird moves.

8. The method of claim 1, further comprising:

defining the object by a time of confirming the object, a location vector of the object, and a size of the object.

9. The method of claim 1, further comprising:

dividing, when the information on the flight operation area is changed, the corridor into the plurality of regions again based on the changed information on the flight operation area.

10. A device for dividing a corridor, comprising:

a transceiver configured to acquire information on a flight operation area of UAM (urban air mobility);

a memory including a computer-executable instruction; and a processor, wherein the information on the flight operation area includes at least one of information on a region of interest in the flight operation area and information on an event which occurs in the flight operation area, and wherein the computer-executable instruction stored on the memory that, when executed by the processor, cause the processor to:

identify of a type of the corridor;

divide the corridor into a plurality of regions based on the type of the corridor;

determine each of the plurality of regions as one of a first region and a second region based on the information on the flight operation area, wherein the first region corresponds to any one of the region of interest and the region where the event occurs, and the second region corresponds to neither the region of interest nor the region where the event occurs;

determine locations and sizes of the first regions and the second regions such that a first size of the first region is smaller than a second size of the second region; and allocate an object to any one of the plurality of regions based on a location of the object in the flight operation area and adjusting the number of objects located in the first regions and the second regions to perform communication without a delay with the objects located in the first region.

11. A non-transitory computer readable storage medium storing a computer-executable instruction, wherein the computer-executable instruction allows a processor to perform a method for dividing a corridor of UAM into a plurality of regions when the computer-executable instruction is executed by the processor, and the method includes:

acquiring information on a flight operation area of the UAM;

dividing a corridor defined in the flight operation area into a plurality of regions based on the information on the flight operation area; and allocating an object to any one of the plurality of regions based on a location of the object in the flight operation area, wherein the information on the flight operation area includes at least one of information on a region of interest in the flight operation area and information on an event which occurs in the flight operation area, wherein the dividing of the corridor into the plurality of regions includes:

identifying of a type of the corridor;

dividing the corridor into the plurality of regions based on the type of the corridor;

determining each of the plurality of regions as one of a first region and a second region based on the information on the flight operation area, wherein the first region corresponds to any one of the region of interest and the region where the event occurs, and the second region corresponds to neither the region of interest nor the region where the event occurs; and determining locations and sizes of the first regions and the second regions such that a first size of the first region is smaller than a second size of the second region and adjusting the number of objects located in the first regions and the second regions to perform communication without a delay with the objects located in the first region.

12. The method of claim 1, further comprising:

defining the object by an identifier of the any one allocated region.

13. The method of claim 1, wherein the determining of the locations and sizes of the plurality of regions, when the identified type of the corridor is a tube, and the plurality of regions are formed in the form of the rectangular parallelepiped, a start points and an end points of the plurality of regions are determined so that an upper surface of a region located at an upper portion and an outer surface of the corridor are in contact with each other, and a lower surface of a region located at a lower portion and the outer surface of the corridor are in contact with each other so that the plurality of regions do not overlap with an adjacent region while including a part of the corridor.

14. The method of claim 1, wherein the determining of the locations and sizes of the plurality of regions, when the identified type of the corridor is a layer, and each of the plurality of regions is formed in the form of the rectangular parallelepiped, a start points and an end points of the plurality of regions are determined so that the corridor meets center points of a plurality of respective regions formed parallel to each other in line so that the plurality of regions of each layer are formed in line to be parallel to an extension direction of the corridor, and do not overlap with an adjacent region while including a part of the corridor.

15. The method of claim 1, wherein the determining of the locations and sizes of the plurality of regions, when the identified type of the corridor is the tube, and the plurality of regions are formed in the form of the sphere, center points and radii of the plurality of regions are determined so that one surface of each of a plurality of regions is in contact with an inner surface of the corridor so that the plurality of regions overlap with the adjacent region without deviating from the corridor.

16. The method of claim 1, wherein the determining of the locations and sizes of the plurality of regions, when the identified type of the corridor is a layer, and each of the plurality of regions is formed in the form of the sphere, center points and radii of the plurality of regions are determined so that the corridor meets the center points of the plurality of respective regions formed parallel to each other in line so that the plurality of regions of each layer are formed in line to be parallel to the extension direction of the corridor, and do not overlap with an adjacent region while including a part of the corridor.

* * * * *